US011886367B2

(12) United States Patent
McLean et al.

(10) Patent No.: US 11,886,367 B2
(45) Date of Patent: Jan. 30, 2024

(54) ARBITRATION ALLOCATING REQUESTS DURING BACKPRESSURE

(71) Applicant: ATI Technologies ULC, Markham (CA)

(72) Inventors: Michael E. McLean, Bolton (CA); Philip Ng, Toronto (CA)

(73) Assignee: ATI Technologies ULC, Markham (CA)

( * ) Notice: Subject to any disclaimer, the term of this patent is extended or adjusted under 35 U.S.C. 154(b) by 117 days.

(21) Appl. No.: 17/545,930

(22) Filed: Dec. 8, 2021

(65) Prior Publication Data

US 2023/0244623 A1    Aug. 3, 2023

(51) Int. Cl.

| | | |
|---|---|---|
| *G06F 13/372* | (2006.01) | |
| *G06F 13/364* | (2006.01) | |
| *G06F 9/48* | (2006.01) | |
| *G06F 13/40* | (2006.01) | |
| *G06F 13/366* | (2006.01) | |

(52) U.S. Cl.
CPC .......... *G06F 13/372* (2013.01); *G06F 9/4812* (2013.01); *G06F 13/364* (2013.01); *G06F 13/366* (2013.01); *G06F 13/4059* (2013.01)

(58) Field of Classification Search
CPC ...... G06F 13/372; G06F 9/4812; G06F 3/364; G06F 13/366; G06F 13/4059; G06F 13/364

See application file for complete search history.

(56) References Cited

U.S. PATENT DOCUMENTS

| | | | | |
|---|---|---|---|---|
| 6,519,225 | B1* | 2/2003 | Angle | H04L 49/3081 370/389 |
| 7,054,330 | B1* | 5/2006 | Chou | H04L 47/50 370/461 |
| 9,942,354 | B1* | 4/2018 | Thompson | H04L 67/125 |
| 2001/0021989 | A1* | 9/2001 | Kang | H03M 13/6569 714/800 |
| 2014/0281057 | A1* | 9/2014 | Cohen | G06F 3/0656 710/52 |
| 2015/0350082 | A1* | 12/2015 | Pawlowski | G06F 3/0679 370/412 |
| 2019/0265774 | A1* | 8/2019 | Tsien | G06F 1/3287 |

(Continued)

*Primary Examiner* — Phong H Dang
(74) *Attorney, Agent, or Firm* — FIG. 1 Patents

(57) ABSTRACT

An arbitration system receives requests to access a destination during an arbitration window that spans multiple processor clock cycles. During each clock cycle, the destination is monitored to determine whether the destination is suffering from backpressure by receiving more requests than the destination is able to accommodate during the clock cycle. In response to detecting backpressure, a masking index value assigned to a requesting source is incremented, which limits an amount of requests from the source that will be granted destination access during a subsequent arbitration window. Alternatively, in response to detecting an absence of backpressure during an arbitration window, the masking index value is decremented, which increases the amount of requests from the source that will be granted destination access during a subsequent arbitration window. This arbitration process continues for successive arbitration windows, oscillating between incrementing and decrementing the masking index value during the successive arbitration windows.

20 Claims, 5 Drawing Sheets

(56) References Cited

U.S. PATENT DOCUMENTS

2020/0097202 A1* 3/2020 Ou .................. G06F 3/0622
2020/0210227 A1* 7/2020 Xie .................... G06F 9/54
2023/0108209 A1* 4/2023 Pilkington ......... H04L 67/1014
                                                                                   709/217

* cited by examiner

300

302

| Index Value | Binary | Decimal |
|---|---|---|
| 0 | Unrestricted | Unrestricted |
| 1 | 100000000 | 256 |
| 2 | 10000000 | 128 |
| 3 | 1000000 | 64 |
| 4 | 100000 | 32 |
| 5 | 10000 | 16 |
| 6 | 1000 | 8 |
| 7 | 100 | 4 |
| 8 | 10 | 2 |
| 9 | 1 | 1 |

304

| Index Value | Component 1 | Component 2 | Component 3 |
|---|---|---|---|
| 0 | Unrestricted | Unrestricted | Unrestricted |
| 1 | 128 | 64 | 64 |
| 2 | 64 | 32 | 32 |
| 3 | 32 | 16 | 16 |
| 4 | 16 | 8 | 8 |
| 5 | 8 | 4 | 4 |
| 6 | 4 | 2 | 2 |
| 7 | 2 | 1 | 1 |
| 8 | 1 | 0 | 0 |

*Fig. 3*

ARBITRATION ALLOCATING REQUESTS DURING BACKPRESSURE

BACKGROUND

Computer technology is regularly advancing, resulting in faster computers. One such area of advancement is hardware communication systems that transfer data between components of a computer or between different computers. As new communication systems are developed, the rate at which data is transferred via the communication systems continues to increase. As a corollary to this increase in available bandwidth, communication systems are leveraged to provide a common means of communication among an increasing number of computers and computer components.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 3 illustrates an example of a configuration register implemented by the arbitration system to perform request arbitration.

DETAILED DESCRIPTION

Overview

Figure 1:
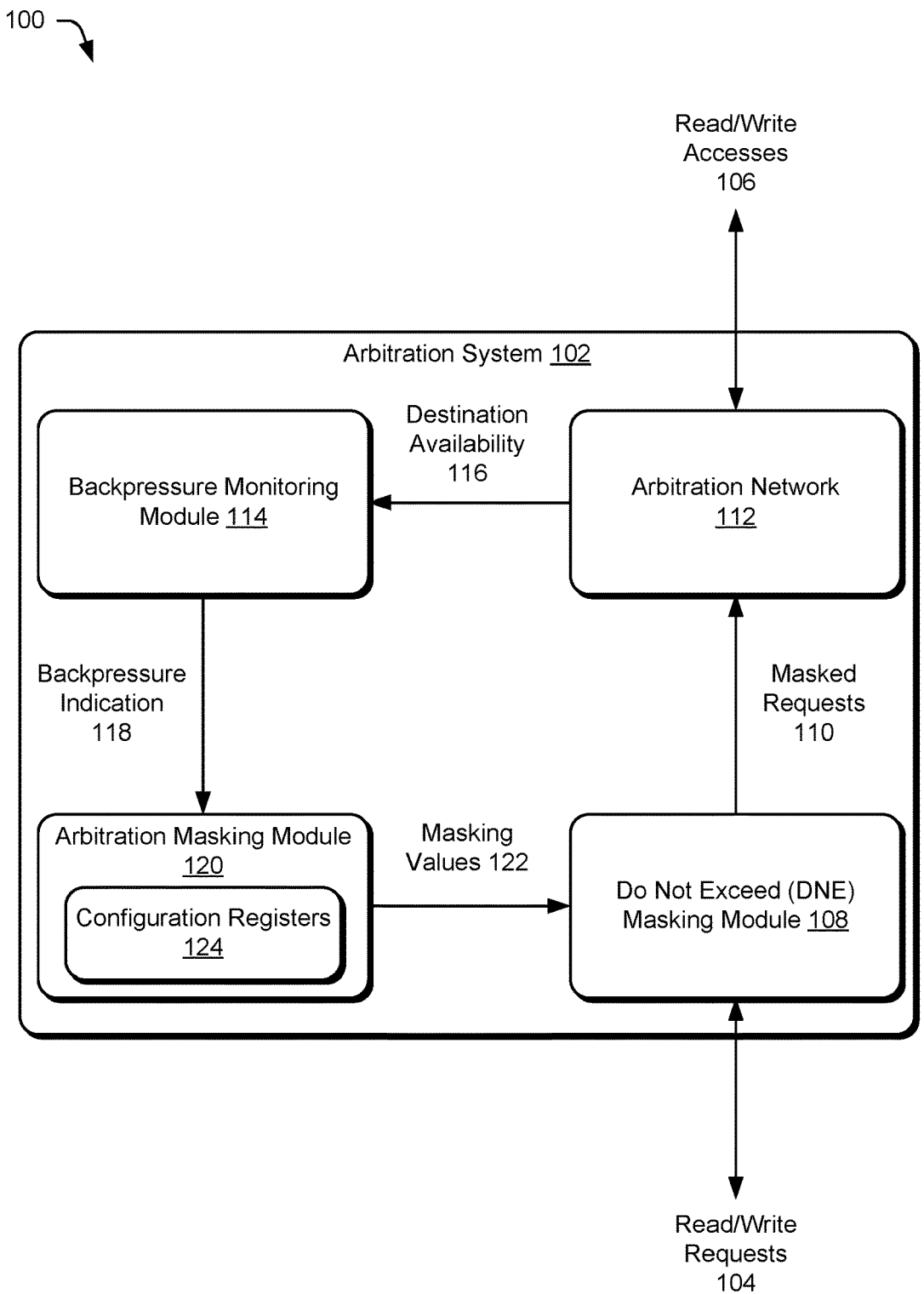
FIG. 1 is an illustration of an example arbitration system that is operable to employ the request arbitration techniques described herein.

With advances in computing device technology, computer architectures are configured such that multiple different components attempt to access shared resources, such as volatile memory (e.g., dynamic random-access memory (DRAM)), nonvolatile memory (e.g., Flash memory or phase-change memory (PCM)), hardware devices (e.g., hard disks, network cards, graphics cards, compute express link (CXL) devices, or hardware accelerators), and so forth. To accommodate these increasing demands, processors are constantly tasked with deciding which computing device components will be granted access at any given point in time. As computing communication speeds continue to increase and as systems are expanded to accommodate additional components, it becomes increasingly difficult to develop logic that can properly allocate these requests while keeping pace with a rate at which the requests are received. To optimize system performance, conventional systems prioritize requests based on a component type from which the request was received. By way of example, requests from a hard drive are traditionally prioritized over requests from a keyboard, under an assumption that a delayed response to a request from a hard drive is more likely to negatively impact system performance than a delayed keyboard request.

Request prioritization based on component type alone, however, often negatively impacts system performance. For instance, certain requesting components often attempt to access a destination (e.g., memory) at a bandwidth that is much greater than a bandwidth required for the requesting component to function properly. In such a conventional scenario where requests are prioritized based on component type alone, a requesting component assigned a higher priority that requests access to a destination at an overly high bandwidth often precludes a lower priority component from functioning properly. By way of example, consider a hard drive assigned a high priority that fully consumes all available memory requests during a given access cycle, despite not needing all the available memory requests to function properly. This greedy consumption prohibits lower priority devices such as a mouse or keyboard from being granted any memory requests during the access cycle, resulting in delayed inputs that the system otherwise should have received from the mouse and keyboard during the access cycle.

To mitigate system performance issues, arbitration networks have been developed to determine, for each central processing unit (CPU) cycle, which pending requests from system components should be granted access to a destination. As described herein, a CPU cycle, or clock cycle, refers to an amount of time between two pulses of an oscillator (e.g., a CPU oscillator crystal). The computational resources required to perform this arbitration decision during each CPU cycle, however, are significant, often requiring considerable time and processor bandwidth to perform each arbitration decision. As computing communication speeds continue to increase, this considerable time and processor bandwidth requirement is unable to scale and arbitrate requests for each cycle without hindering communication speed. By way of example, in an example implementation where a system is configured to grant access to twenty requests per CPU clock cycle, the time required by conventional arbitration networks to determine which twenty requests should be granted access necessarily must be performed before the requests are granted access. This time involved in determining which twenty requests should be granted often consumes at least one clock cycle, during which the 20 requests otherwise could have been granted access, thus slowing the communication rate between a requesting component and a destination.

To address these conventional shortcomings, the techniques described herein grant requests access to a destination during an arbitration window that spans multiple processor clock cycles. During each of the clock cycles in the arbitration window, the destination is monitored to determine whether the destination is suffering from backpressure. As described herein, a destination suffers from backpressure when the destination receives more requests than the destination is able to accommodate during the clock cycle. At the end of each arbitration window, a determination is made as to whether backpressure was detected at the destination during one or more of the clock cycles encompassed by the arbitration window. In response to determining that backpressure was detected during the arbitration window, a masking value assigned to one or more requesting components is incremented, which limits an amount of requests from the one or more requesting components that will be granted access to the destination during a subsequent arbitration window. In some implementations, incrementing the masking value is performed using a right bit shift operation, which halves an amount of requests that will be granted to a requesting component during the subsequent arbitration window.

Alternatively, in response to detecting no backpressure during an arbitration window, the masking value is decremented, which increases the amount of requests from one or more requesting components that will be granted access to the destination during a subsequent arbitration window. In some implementations, decrementing the masking value is performed using a left bit shift operation, which doubles the amount of requests that will be granted access to a destination during the subsequent arbitration window. This arbitration process continues for successive arbitration windows, until a steady oscillation is achieved between incrementing and decrementing the masking value during successive arbitration windows.

By offloading the arbitration decision from being a critical operation performed during each clock cycle to a decision made over an arbitration window spanning multiple clock cycles, the techniques described herein advantageously avoid the undue delay induced by conventional arbitration systems. Further, by adjusting masking values using left and right bit shifting operations, the techniques described herein require minimal processing resources when performing request arbitration.

In some examples, the techniques described herein relate to a method including: receiving a plurality of requests to access a destination from at least one source; granting each of the plurality of requests access to the destination during a first arbitration window; detecting backpressure at the destination responsive to determining that a number of the plurality of requests exceed a number of requests available for receipt by the destination during the first arbitration window; assigning a masking value that decreases the number of the plurality of requests; and granting a reduced number of requests access to the destination during a second arbitration window based on the masking value.

In some examples, the techniques described herein relate to a method, wherein the arbitration window comprises a plurality of clock cycles of a processor device and granting each of the plurality of requests access to the destination comprises distributing access to the plurality of requests across the plurality of clock cycles, wherein detecting backpressure at the destination is performed based on the number of requests available for receipt by the destination during each of the plurality of clock cycles.

In some examples, the techniques described herein relate to a method, wherein the reduced number of requests comprises half of the number of the plurality of requests.

In some examples, the techniques described herein relate to a method, further including detecting backpressure at the destination during the second arbitration window and updating the masking value to grant a quarter of the number of the plurality of requests access to the destination during a third arbitration window.

In some examples, the techniques described herein relate to a method, further including updating the masking value to grant the number of the plurality of requests access to the destination during a third arbitration window in response to detecting that the reduced number of requests is less than the number of requests available for receipt by the destination during the second arbitration window.

In some examples, the techniques described herein relate to a method, wherein the masking value specifies a number of requests to be granted for each of a plurality of computing device components.

In some examples, the techniques described herein relate to a method, wherein assigning the masking value comprises performing a right bit shift operation.

In some examples, the techniques described herein relate to a method, wherein granting each of the plurality of requests access to the destination comprises communicating each of the plurality of requests to a buffer that communicates requests to the destination in response to receiving an indication of availability from the destination and wherein granting the reduced number of requests access to the destination comprises communicating the reduced number of requests to the buffer.

In some examples, the techniques described herein relate to a method, wherein assigning the masking value comprises incrementing an index value for a lookup table that specifies request limit values for the at least one source.

In some examples, the techniques described herein relate to a method, wherein assigning the masking value comprises designating a first number of requests to be granted access for a first source of the at least one source during the second arbitration window and designating a second number of requests that is different than the first number of requests to be granted access for a second source of the at least one source during the second arbitration window.

In some examples, the techniques described herein relate to a method, wherein the at least one source comprises a plurality of sources and assigning the masking value comprises assigning a distribution of the number of the plurality of requests among the plurality of sources.

In some examples, the techniques described herein relate to a method, including receiving a plurality of requests to access a destination from at least one source; granting a subset of the plurality of requests access to the destination during a first arbitration window; detecting an absence of backpressure at the destination responsive to determining that a number of the plurality of requests available for receipt by the destination during the first arbitration window exceed a number of requests included in the subset of the plurality of requests; assigning a masking value that increases the number of the plurality of requests; and granting an increased number of requests access to the destination during a second arbitration window based on the masking value.

In some examples, the techniques described herein relate to a method, wherein the arbitration window comprises a plurality of clock cycles of a processor device and granting the subset of the plurality of requests access to the destination comprises distributing access to the subset of the plurality of requests across the plurality of clock cycles.

In some examples, the techniques described herein relate to a method, wherein the increased number of requests comprises double the number of requests included in the subset of the plurality of requests.

In some examples, the techniques described herein relate to a method, further including detecting backpressure at the destination during the second arbitration window and updating the masking value to grant the number of requests included in the subset of the plurality of requests access to the destination during a third arbitration window.

In some examples, the techniques described herein relate to a method, further including detecting an absence of backpressure at the destination during the second arbitration window and updating the masking value to grant quadruple the number of requests included in the subset of the plurality of requests during a third arbitration window.

In some examples, the techniques described herein relate to a method, wherein assigning the masking value comprises performing a left bit shift operation.

In some examples, the techniques described herein relate to a method, wherein granting the subset of the plurality of requests access to the destination comprises communicating each of the subset of the plurality of requests to a buffer that communicates requests to the destination in response to receiving an indication of availability from the destination.

In some examples, the techniques described herein relate to a method, wherein assigning the masking value comprises decrementing an index value for a lookup table that specifies request limit values for the at least one source.

In some examples, the techniques described herein relate to a system including: a masking module configured to receive a plurality of requests to access a destination during a first arbitration window and grant access to each of the plurality of requests during the first arbitration window; a backpressure monitoring module configured to detect backpressure at the destination during the first arbitration window in response to determining that a number of the plurality of requests exceed a number of requests available for receipt by the destination during the first arbitration window; an arbitration masking module configured to assign a masking value that halves the number of the plurality of requests in response to detecting backpressure at the destination during the first arbitration window; the masking module further configured to grant a limited number of requests access to the destination during a second arbitration window based on the masking value; the backpressure monitoring module further configured to detect an absence of backpressure at the destination during the second arbitration window in response to determining that a number of requests available for receipt by the destination during the second arbitration window exceed the limited number of requests; the arbitration masking module further configured to update the masking value to double the limited number of requests in response to detecting the absence of backpressure at the destination during the second arbitration window; and the masking module further configured to grant requests access to the destination during a third arbitration window based on the updated masking value.

FIG. 1 is an illustration of a digital medium environment 100 that includes an arbitration system 102 configured to employ the request arbitration techniques described herein. The arbitration system 102 is configured to manage requests for access to a destination, such as to receive read and write requests 104 from one or more sources and grant a subset of the read and write requests 104 access to the destination as read and write accesses 106. As part of facilitating access to the destination, the arbitration system 102 is further configured to return any appropriate data from the destination to a requesting source (e.g., the requested data for a write access). In implementations, the arbitration system 102 receives the read and write requests 104 from a variety of sources, such as a hard disk, a network card, a processing device component linked to the arbitration system 102 via a universal serial bus (USB), a graphics card, a CXL device, an accelerator, one or more input/output devices (e.g., a keyboard or a mouse), and so forth. The destination to which the read and write accesses 106 are granted is representative of a variety of destinations, such as physical memory (e.g., DRAM, Flash memory, PCM, and so forth), a hard disk, a network card, a graphics card, a CXL device, a hardware accelerator, and so forth.

In one or more implementations, the arbitration system 102 is implemented in software. For example, the arbitration system 102 is part of an operating system of a computing device or software of a computing device component configured to facilitate communication between a requesting source and a destination (e.g., a Peripheral Component Interconnect (PCI) bus). Additionally or alternatively, the arbitration system 102 is implemented in hardware. For example, the arbitration system 102 is implemented in an integrated circuit of a computing device component configured to facilitate communication between a requesting source and a destination, such as an integrated circuit of a PCI bus. By way of another example, the arbitration system 102 resides in the same device package or integrated circuit as the destination to which the read and write accesses 106 are granted.

Thus, the arbitration system 102 is implementable in a smartphone or other wireless phone, a tablet or phablet computer, a notebook computer (e.g., netbook or ultrabook), a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IoT) device, an automotive computer, and so forth.

To facilitate request arbitration in the presence of backpressure at the destination, the arbitration system 102 includes a do not exceed (DNE) masking module 108. The DNE masking module 108 is configured to pass a subset of the read and write requests 104, represented as masked requests 110 in the illustrated example of FIG. 1, to an arbitration network 112. The arbitration network 112 is configured to communicate the masked requests 110 received from the DNE masking module 108 as read and write accesses 106 to a corresponding destination. In some implementations, the arbitration network 112 communicates the read and write accesses 106 to a downstream buffer implemented between the arbitration network 112 and the destination, such as a buffer configured to communicate the read and write accesses 106 to the destination on a first-in, first-out (FIFO) basis. By way of example, the arbitration network 112 communicates the read and write accesses 106 to a buffer configured to maintain read and write requests in memory and abstain from passing the read and write requests to a destination until the destination indicates to the buffer availability to process one or more read or write requests.

In some implementations, the arbitration network 112 is configured to grant the masked requests 110 as read and write accesses 106 to the destination based on information specifying a maximum latency for a source from which a corresponding read or write request 104 is received. The maximum latency indicates a time within which a requesting source is allowed to transfer its read or write request 104 as a read or write access 106 to the destination without comprising system performance. Accordingly, the arbitration network 112 is representative of functionality of the arbitration system 102 to maintain information specifying a maximum latency for each source from which the read and write requests 104 are received and ensure that the read or write accesses 106 are passed to the destination within the maximum latency for the source to reduce system latency. In this manner, the arbitration network 112 is representative of a multi-cycle arbitration network where the read and write requests 104 are granted access to a destination over different clock cycles of an arbitration window, prioritized based on latency values for sources from which the read and write requests 104 are received.

The arbitration system 102 further includes a backpressure monitoring module 114, which is configured to monitor an output of the arbitration network 112 during each clock cycle included in the arbitration window. The backpressure monitoring module 114 is further configured to monitor an amount of requests capable of being received by the destination during the arbitration window. By way of example, in some implementations the destination indicates to the arbitration network 112 a number of available credits at each clock cycle during the arbitration window, where the number of available credits indicates an amount of read and write accesses 106 the destination is currently capable of receiving from the arbitration network 112. The number of credits made available by the destination to the arbitration system 102 is represented as destination availably 116 in the illustrated example of FIG. 1. The backpressure monitoring module 114 compares the destination availability 116 to a number of the read and write accesses 106 output by the arbitration network 112 at each clock cycle in the arbitration window.

In response to detecting that a number of the read and write accesses 106 exceeded a number of credits indicated in the destination availability 116 for the clock cycle, the backpressure monitoring module 114 determines that backpressure occurred at the destination during the clock cycle. Alternatively, in response to detecting that a number of the read and write accesses 106 did not exceed a number of credits indicated in the destination availability 116 for the clock cycle, the backpressure monitoring module 114 determines an absence of backpressure at the destination during the clock cycle.

The backpressure monitoring module 114 is configured to output a backpressure indication 118 upon detecting backpressure at the destination during any clock cycle in an arbitration window. For instance, upon detecting backpressure at the destination during one of 64 clock cycles in an arbitration window, the backpressure monitoring module 114 outputs a backpressure indication 118 for the arbitration window. The backpressure indication 118 represents a binary indicator of whether backpressure was detected or not detected at the destination during the arbitration window. In some implementations, the backpressure monitoring module 114 outputs the backpressure indication 118 upon detecting backpressure during the arbitration window. By way of example, if no backpressure is detected during the first five clock cycles of a 64-clock cycle arbitration window and backpressure is detected at the sixth clock cycle of the arbitration window, the backpressure indication 118 is output during the seventh clock cycle of the arbitration window.

In this manner, the backpressure monitoring module 114 enables the arbitration system 102 to adapt to the detection of backpressure at the destination by making appropriate adjustments for a subsequent arbitration window, prior to completion of a current arbitration window and thereby avoid undue delay. Alternatively, in response to detecting an absence of backpressure at the destination during an arbitration window, the backpressure monitoring module 114 is configured to output the backpressure indication 118 at the conclusion of an arbitration window. The backpressure indication 118 indicating presence or absence of backpressure at the destination during an arbitration window is provided to an arbitration masking module 120.

The arbitration masking module 120 is representative of functionality of the arbitration system 102 to assign one or more masking values 122 that restricts (e.g., decreases) a number of read and write requests 104 that are granted as read and write accesses 106 during a subsequent arbitration window, on a source-specific basis. To do so, the arbitration masking module 120 maintains a configuration register 124 for each of the one or more sources from which the read and write requests 104 are received. Each configuration register 124 specifies a degree by which read and write requests 104 received from a particular source are to be decreased in response to detecting backpressure at a destination. In implementations, the arbitration masking module 120 obtains each configuration register 124 from software and/or firmware of a source from which one or more of the read and write requests 104 are received.

As described in further detail below with respect to FIG. 3, the configuration registers 124 maintained by the arbitration masking module 120 thus represent a repository of information specifying an initial response to backpressure for each source from which a read or write request 104 is received. In some implementations, the configuration registers 124 include information describing a relative bandwidth distribution to allocate among the sources in the presence of backpressure, which enables granting higher prioritized sources additional read and write accesses 106 over lower prioritized sources when backpressure is detected at a destination.

Based on the backpressure indication 118, the arbitration masking module 120 adjusts a pointer to an index value in the configuration registers 124 and determines the appropriate masking values 122 for a subsequent arbitration window. The masking values 122 represent a maximum number of read or write requests 104 for each source to be granted as a read or write access 106 to the destination during a subsequent arbitration window. During the subsequent arbitration window, the DNE masking module 108 limits the read and write requests 104 received from each source by passing a number of masked requests 110 that does not exceed the masking value 122 for the source to the arbitration network 112.

During an initial arbitration window, the DNE masking module 108 passes each of the read and write requests 104 as masked requests 110 to the arbitration network 112. During the initial arbitration window, the masking values 122 indicate that each source from which the read and write requests 104 are received should be provided unrestricted access to the destination, due to an absence of backpressure previously detected at the destination. The arbitration network 112 in turn passes the masked requests 110 as read and write accesses 106 to a destination (e.g., by communicating the read and write accesses 106 to a downstream buffer implemented between the arbitration network 112 and the destination). In some implementations, the arbitration network 112 distributes communication of the read and write accesses 106 to the destination over a plurality of clock cycles encompassed by the initial arbitration window, where an output of the read and write accesses 106 by the arbitration system 102 is ordered based on maximum latency values associated with sources from which the read and write requests 104 are received.

The backpressure monitoring module compares, for each clock cycle in the initial arbitration window, whether an amount of read and write accesses 106 exceeds the destination availability 116 for the clock cycle (e.g., a number of requests indicated by the destination as being available for receipt during the clock cycle). In response to detecting that the amount of read and write accesses 106 communicated to the destination during a clock cycle exceeds the destination availability during the clock cycle, the backpressure monitoring module 114 outputs a backpressure indication 118 denoting occurrence of backpressure during the arbitration window. The arbitration masking module 120 then determines masking values 122 for a subsequent arbitration window, which limit an amount of read and write accesses 106 for the subsequent arbitration window to reduce backpressure at the destination.

Although described herein with respect to example implementations where the arbitration system 102 is implemented remotely from the destination, in some implementations the arbitration system 102 is implemented locally at the destination. For instance, the arbitration system 102 is implemented locally at the destination as an intermediary between at least one component of the destination (e.g., memory) and at least one source requesting access to the destination (e.g., a hard disk, an input/output device, etc.). In implementations where the arbitration system 102 is implemented locally at the destination, the downstream buffer is implemented locally at the arbitration network 112, such that the arbitration system 102 restricts access provided to the at least one source by increasing or decreasing an amount of requests passed by the arbitration system 102 as read and write accesses 106 to the at least one component of the destination.

Figure 2:
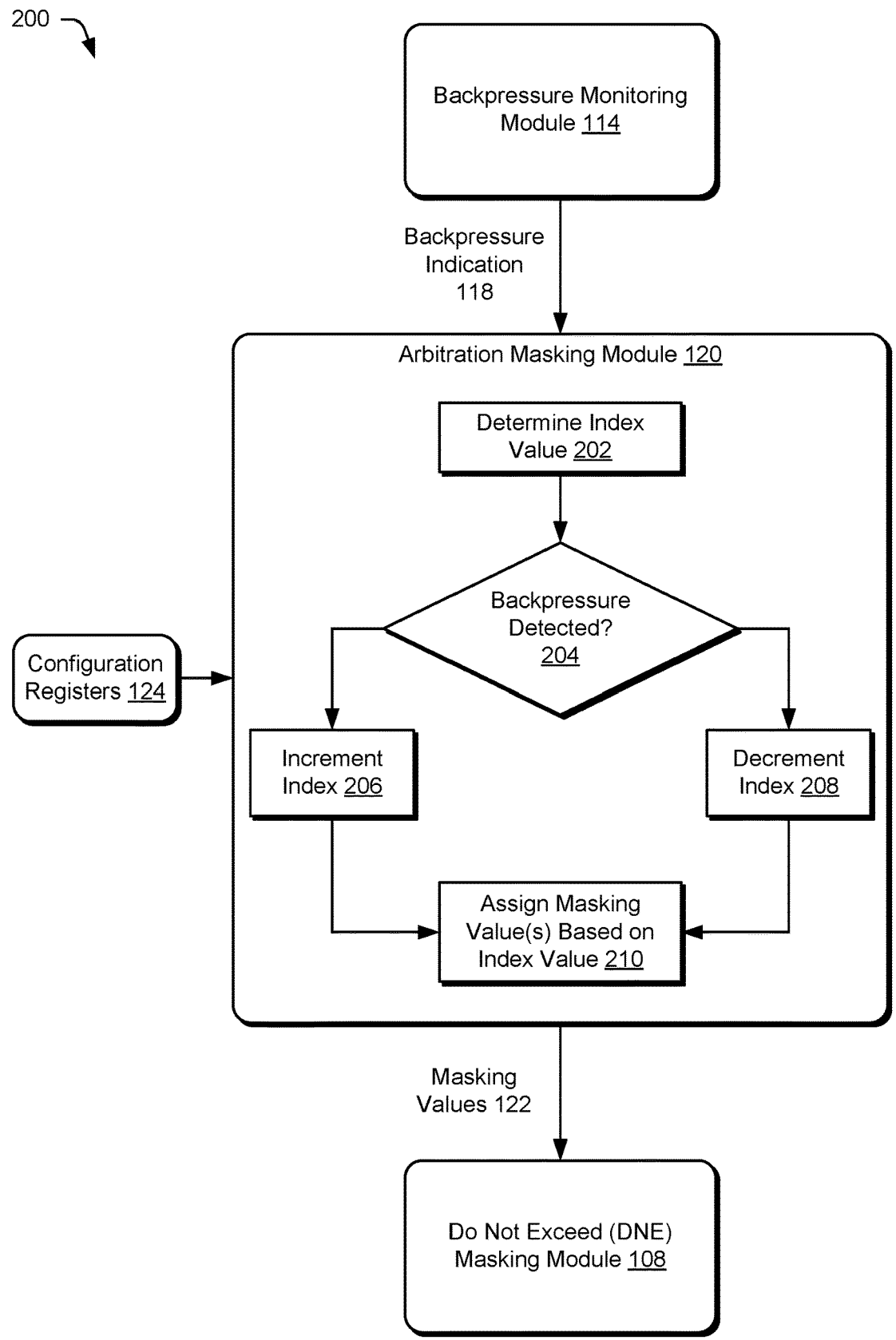
FIG. 2 illustrates an example depicting functionality of the arbitration system in further detail.

FIG. 2 illustrates an example 200 of the architecture of the arbitration system 102 determining masking values 122 that limit an amount of requests granted access to a destination during a second arbitration window in response to detecting backpressure at the destination during a first arbitration window. In the illustrated example of FIG. 2, the arbitration masking module 120 receives a backpressure indication 118 from the backpressure monitoring module 114. To determine appropriate masking values 122 for a subsequent arbitration window, the arbitration masking module 120 determines an index value for a configuration register 124 used to restrict access to the destination during a current arbitration window. The configuration register 124 specifies, for each source from which the read and write requests 104 are received, varying degrees by which requests from the source are to be decreased when granting access to the destination in the presence of backpressure at the destination. For an example of configuration registers 124 leveraged by the arbitration masking module 120, consider FIG. 3.

FIG. 3 illustrates an example 300 of configuration registers 124 leveraged by the arbitration masking module 120, such as configuration register 302 and configuration register 304. Configuration register 302 represents an example of a configuration register 124 that includes values for restricting access to a destination for at least one source in the presence of backpressure. Specifically, configuration register 302 includes a plurality of index values, where each index value is correlated with a number that represents an amount of requests not to be exceeded. For instance, configuration register 302 indicates that for an index value of zero (e.g., an index value used during an initial arbitration window), requests from sources are to be granted unrestricted access to a destination. Configuration register 302 further indicates that for an index value of one, no more than 256 requests are to be granted access to the destination during an arbitration window (represented as 100000000 in binary).

In some implementations, the number of requests correlating to an index value of one in a configuration register 124 is specified by software and or firmware of a source from which a read or write request 104 is received. Alternatively or additionally, the number of requests correlating to an index value of one in a configuration register 124 is designated by the arbitration masking module 120 based on an indication of an amount of requests generally capable of being received by a destination during an arbitration window (e.g., a number of credits indicated in the destination availability 116 multiplied by a number of clock cycles encompassed by the arbitration window).

Increasing index values in the configuration register 302 indicate progressively restrictive (e.g., progressively decreasing) amounts of requests that are to be granted access to a destination during an arbitration window (e.g., 128 requests for an index value of 2, 64 requests for an index value of 3, 32 requests for an index value of 4, 16 requests for an index value of 5, 8 requests for an index value of 6, 4 requests for an index value of 7, 2 requests for an index value of 8, and 1 request for an index value of 9). In this manner, the index values of configuration register 302 specify various limitations on a number of requests (e.g., read and write requests 104) received from one or more sources to be granted access to a destination during an arbitration window. The restrictive amount of requests noted in configuration register 302 are representative of a restriction for a single source, or for a plurality of sources from which the read and write requests 104 are received. By way of example, an index value of 1 is representative of limiting a number of read and write accesses 106 to be granted during an arbitration window to either 256 for a single source or 256 for a plurality of sources (e.g., an entirety of sources from which the read and write requests 104 are received during the arbitration window).

Configuration register 304 represents an example of a configuration register 124 that includes values for restricting access to a destination for multiple sources in the presence of backpressure, where different ones of the multiple sources are prioritized relative to one another. Specifically, configuration register 304 includes a plurality of index values, where each index value is correlated with a number that represents an amount of requests not to be exceeded for each of a plurality of components (e.g., each of a plurality of sources from which read and write requests 104 are received).

For instance, configuration register 304 indicates that for an index value of zero, requests from component 1, component 2, and component 3 are to be granted unrestricted access to a destination. Configuration register 304 further indicates that for an index value of one, no more than 256 requests are to be granted access to the destination during an arbitration window, with 128 requests allocated to component 1, and 64 requests allocated to each of component 2 and component 3. Configuration register 304 further indicates that for an index value of two, no more than 128 requests are to be granted access to the destination, with 64 requests allocated to component 1 and 32 requests allocated to each of component 2 and component 3. The index values of configuration register 304 specify further restrictions on respective numbers of requests granted to each of components 1, 2, and 3, until reaching an index value of 8, which specifies that only one request received from component 1 is to be granted access to the destination and that components 2 and 3 are prohibited from accessing the destination during an arbitration window.

Returning to FIG. 2, the arbitration masking module 120 determines an index value for a configuration register 124 used to restrict access to the destination during a current arbitration window (block 202). For instance, assuming that a current arbitration window is an initial arbitration window, the arbitration masking module 120 determines that an index value of zero is being used for the current arbitration window, designating unrestricted access to the destination.

The arbitration masking module 120 then determines whether backpressure is detected by the backpressure monitoring module 114, based on the backpressure indication 118 (block 204). In response to detecting backpressure at the destination, the arbitration masking module 120 increments an index value in the configuration registers 124 (block 206). By way of example, the arbitration masking module 120 increments an index value in configuration register 302 from zero to one. As a further example, in a scenario where the arbitration masking module 120 determines that an index value of one is being used to restrict destination access during a current arbitration window, the arbitration masking module 120 increments the index value from one to two, and so forth.

Alternatively, in response to detecting absence of backpressure at the destination, the arbitration masking module 120 decrements an index value in the configuration registers (block 208). By way of example, the arbitration masking module 120 maintains an index value in configuration register 302 at zero (e.g., a lowest index value in the configuration register) in response to detecting an absence of backpressure at the destination during a current arbitration window. As a further example, in a scenario where the arbitration masking module 120 determines that an index value of one is being used to restrict destination access during a current arbitration window, the arbitration masking module 120 decrements the index value from one to zero, responsive to detecting an absence of backpressure at the destination.

The arbitration masking module 120 then assigns one or more masking values based on the index value (block 210) and communicates the masking values 122 to the DNE masking module 108. In some implementations, assigning the masking values 122 based on the updated index value comprises performing a left or right bit shift operation. For instance, in response to detecting backpressure during a current arbitration window, a binary representation of the DNE value for one or more sources as indicated by a current index value in the configuration registers 124 is shifted right (e.g., divided by two), effectively halving an amount of requests from the one or more sources that will be granted access to the destination during a subsequent arbitration window.

Alternatively, in response to detecting an absence of backpressure during a current arbitration window, a binary representation of the DNE value for one or more sources as indicated by a current index value in the configuration registers 124 is shifted left (e.g., multiplied by two), effectively doubling an amount of requests from the one or more sources that will be granted access to the destination during a subsequent arbitration window. In this manner, by assigning the masking values 122 using left or right bit shifting operations, the arbitration masking module 120 consumes an inexpensive amount of processor resources when performing the bit shifting operations and can do so in a rapid manner, rather than requiring the use of adders or multipliers in computing the masking values 122. Alternatively or additionally, in some implementations the masking values 122 are computed by adding or subtracting a fixed value from a previous masking value 122 for a source. Alternatively or additionally, in some implementations the configuration registers 124 are configured as one or more lookup tables with values specifying an amount of requests that each source can be granted access in the presence of backpressure, such as the example configuration register 304. The masking values 122 are then communicated to the DNE masking module 108 for use in restricting a number of the read and write requests 104 that are passed as masked requests 110 to the arbitration network 112 during a subsequent arbitration window, where functionality of the arbitration system 102 proceeds for successive arbitration windows.

Figure 4:
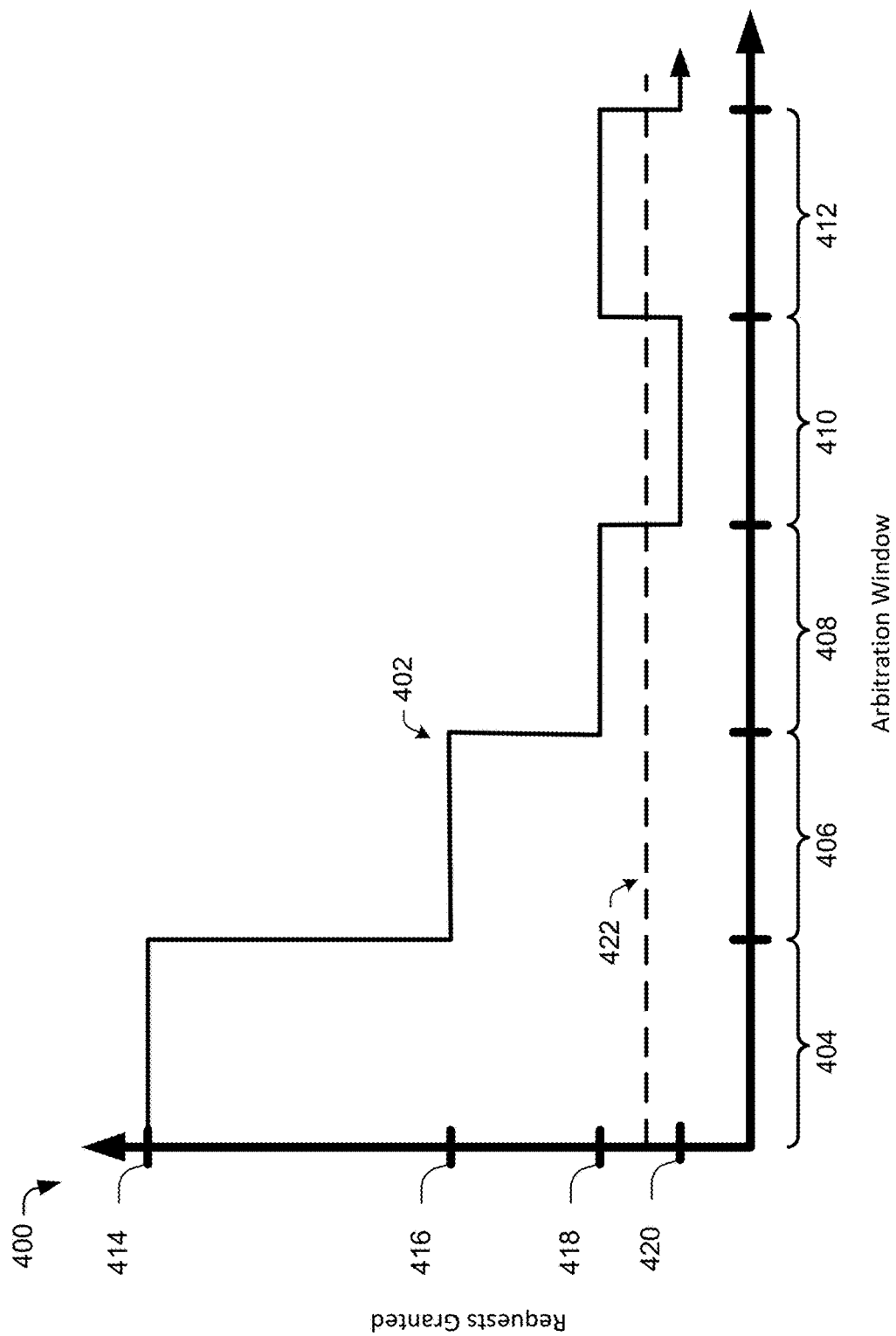
FIG. 4 illustrates a graph representing an example of arbitrating an amount of requests granted in response to determining whether backpressure was detected at a destination during a preceding arbitration window.

FIG. 4 illustrates a graph 400 that represents an example of the arbitration system 102 arbitrating an amount of requests granted access to a destination in response to determining whether backpressure was detected at the destination during a preceding arbitration window.

In the illustrated example of FIG. 4, the graph 400 plots a line 402 that represents an amount of requests granted access to a destination per arbitration window, over a period of successive arbitration windows. Specifically, the graph 400 plots the line 402 relative to arbitration window 404, arbitration window 406, arbitration window 408, arbitration window 410, and arbitration window 412. Arbitration window 404 represents an initial arbitration window during which a first amount 414 of read and write requests 104 are granted as read and write accesses 106 to a destination. Graph 400 depicts an example implementation where backpressure is detected during the arbitration window 404, which causes the arbitration system 102 to decrease access to the destination, represented by a second amount 416 that represents half of the first amount 414 of read and write requests 104 being granted as read and write accesses 106 to the destination during the arbitration window 406.

Similarly, graph 400 depicts an example implementation where backpressure is again detected during arbitration window 406, which causes the arbitration system 102 to further restrict access to the destination during arbitration window 408. As depicted in the illustrated example of FIG. 4, during arbitration window 408 read and write requests 104 are restricted from the accessing the destination to a third amount 418 that is half the second amount 416 and a quarter of the first amount 414. Line 402 represents that further backpressure is detected during arbitration window 408, which causes the arbitration system 102 to further restrict access to the destination during arbitration window 410, during which time only a fourth amount 420 of read and write requests 104 are granted as read and write accesses 106 to the destination.

As depicted in graph 400, the increase in requests granted access as depicted by the line 402 increasing from the fourth amount 420 during arbitration window 410 to the third amount 418 during arbitration window 412 indicates that an absence of backpressure was detected at the destination during arbitration window 410. Conversely, by returning to the fourth amount 420 following arbitration window 412, the line 402 indicates that the arbitration system 102 detected backpressure at the destination during the arbitration window 412.

In this manner, the arbitration system is configured to achieve a steady state where read and write requests 104 are granted access to a destination at two oscillating values during successive arbitration windows, with one of the two oscillating values being half of the other. In this manner, a theoretical amount of requests available for receipt by the destination during a given arbitration window is represented by line 422, such that the third amount 418 and the fourth amount 420 represent the two oscillating values at which the arbitration system 102 grants sources read and write accesses 106 to a destination during successive arbitration windows.

By computing the masking values 122 that restrict a degree by which individual sources are permitted to access a destination during an arbitration window, the arbitration system 102 offloads the computation of masking values from being performed during each clock cycle at which read and write accesses 106 are communicated from the arbitration system 102 to the destination. By offloading this computation from being performed each clock cycle, the arbitration system 102 avoids introducing undue delay into the communication between a requesting source and a destination via the time required to compute masking values to achieve an optimal rate of requests for the destination (e.g., a rate represented by line 422 in FIG. 4). Further, by communicating the read and write accesses 106 to a downstream buffer implemented between the arbitration network and the destination, the arbitration system 102 ensures that read and write requests 104 are not delayed, even in the presence of backpressure at the destination.

The following discussion describes techniques that are implemented utilizing the previously described systems and devices. Aspects of the procedure are implemented in hardware, firmware, software, or a combination thereof The procedure is shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-4.

Figure 5:
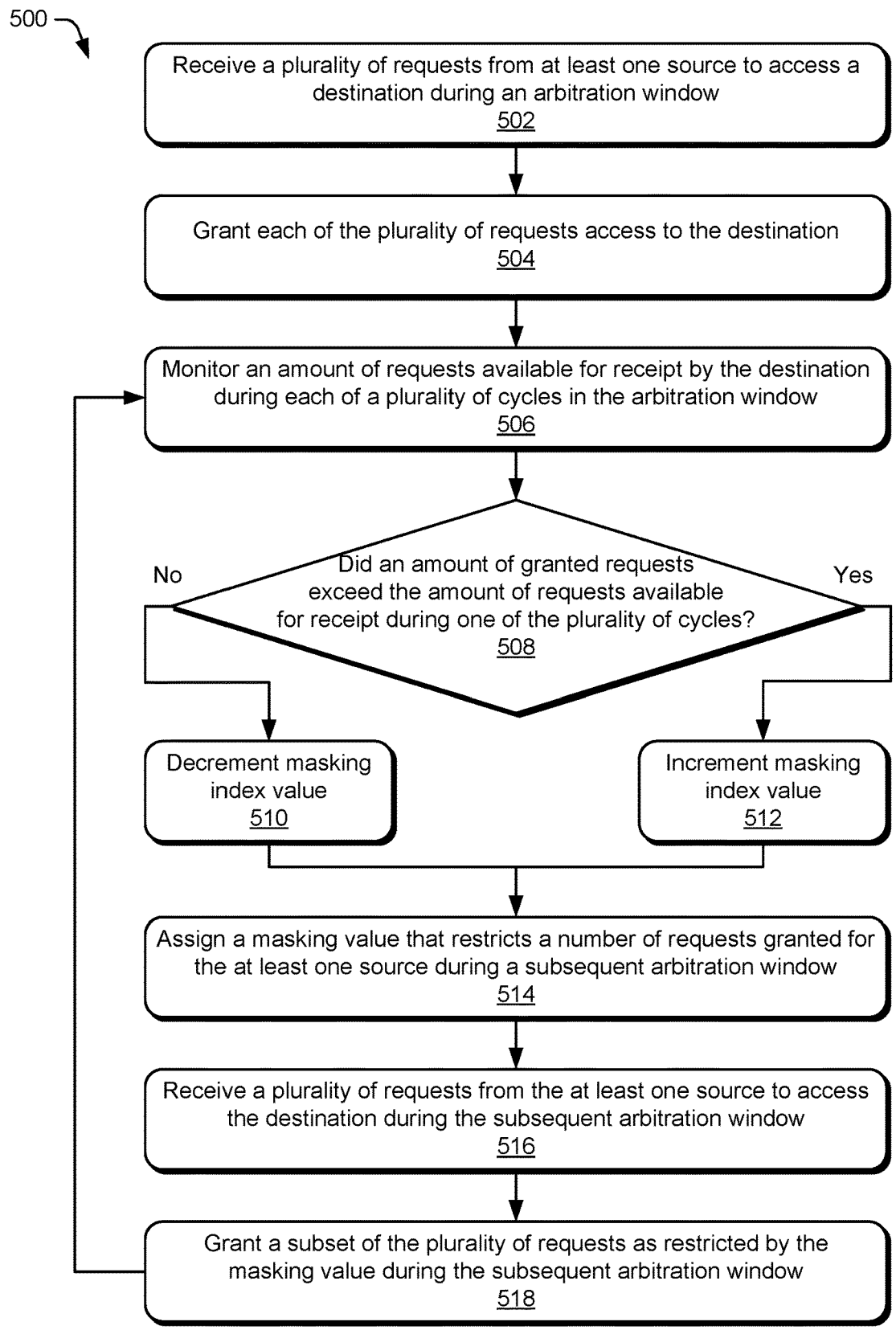
FIG. 5 is a flow diagram depicting a procedure in an example implementation of performing arbitration to allocate request during backpressure.

FIG. 5 is a flow diagram 500 depicting a procedure in an example implementation of request arbitration to reduce backpressure. The flow diagram 500 is performed by an arbitration system such as the arbitration system 102 of FIG. 1 or as depicted in the example 200 of FIG. 2.

In this example, a plurality of requests to access a destination are received from at least one source during an arbitration window (block 502). The DNE masking module 108, for instance, receives a plurality of read/write requests 104 from at least one source, such as a hard disk, a network card, a USB peripheral, a graphics card, an input/output device (e.g., keyboard, mouse, etc.), and so forth.

Each of the plurality of requests are granted access to the destination (block 504). The DNE masking module 108, for instance, passes each of the read/write requests 104 to the arbitration network 112 as masked requests 110. The arbitration network 112 then forwards the masked requests 110 as read/write accesses 106 to a downstream buffer implemented between the arbitration network 112 and the destination. In some implementations, the buffer is implemented locally at the arbitration network 112, such that read/write accesses 106 are individually passed from the arbitration network 112 to the destination in response to receiving an indication from the destination that the destination is able to process an additional request. In some implementations where the buffer is implemented locally at the arbitration network 112, the arbitration system 102 is implemented locally at the destination, such that the arbitration system 102 restricts access provided to at least one requesting source by increasing or decreasing an amount of requests passed by the arbitration system 102 as read and write accesses 106 to at least one component of the destination.

An amount of requests available for receipt by the destination is monitored during each of a plurality of cycles in the arbitration window (block 506). The arbitration window, for instance, spans a plurality of clock cycles of a processor component implementing the arbitration system 102. By way of example, the arbitration window spans 64 clock cycles. The backpressure monitoring module 114, for instance, receives an indication of available credits at the destination as the destination availability 116.

A determination is made as to whether an amount of granted requests exceeded the amount of requests available for receipt by the destination during one of the plurality of cycles (block 508). The backpressure monitoring module 114, for instance, compares the destination availability 116 to an amount of read/write accesses 106 communicated to the destination for each clock cycle. In response to determining that the amount of read/write accesses 106 exceeded the destination availability 116 during a clock cycle in the arbitration window, the backpressure monitoring module 114 detects backpressure at the destination. Alternatively, in response to determining that the amount of read/write accesses 106 did not exceed the destination availability 116 during one or more clock cycles in the arbitration window, the backpressure monitoring module 114 detects an absence of backpressure at the destination.

In response to detecting an absence of backpressure at the destination, a masking index value is decremented (block 510). The arbitration masking module 120, for instance, decrements a masking index value for at least one requesting source from which the read/write requests 104 were received. In some implementations, decrementing a masking index value for a requesting source comprises performing a left bit shift operation, which effectively doubles an amount of read/write requests 104 from the requesting source that will be granted access to a destination during a subsequent arbitration window. Alternatively or additionally, decrementing a masking index value for a requesting source comprises adjusting a pointer to a lower index value in a configuration register 124 for the requesting source, where the configuration register specifies a number of requests that are granted access for each of a plurality of index values. By way of example, a lowest index value in the configuration register 124 indicates an unrestricted amount of access requests granted to a requesting source and a highest index value in the configuration register 124 indicates a most restrictive amount of access requests granted to the requesting source.

Alternatively, in response to detecting backpressure at the destination, a masking index value is incremented (block 512). The arbitration masking module 120, for instance, increments a masking index value for at least one requesting source from which the read/write requests 104 were received. In some implementations, incrementing a masking index value for a requesting source comprises performing a right bit shift operation, which effectively halves an amount of read/write requests 104 from the requesting source that will be granted access to a destination during a subsequent arbitration window. Alternatively or additionally, incrementing the masking index value for the requesting source comprises adjusting a pointer to a higher index value in a configuration register 124 for the requesting source, where the configuration register specifies a number of requests that are granted access for each of a plurality of index values. By way of example, a lowest index value in the configuration register 124 indicates an unrestricted amount of access requests granted to a requesting source and a highest index value in the configuration register 124 indicates a most restrictive amount of access requests granted to the requesting source.

A masking value that restricts a number of request granted for the at least one source during a subsequent arbitration window is then assigned (block 514). The arbitration masking module 120, for instance, communicates masking values 122 to the DNE masking module 108, where the masking values 122 specify a limit for each of one or more requesting components from which the read/write requests 104 are received. In some implementations, the masking values 122 indicate an even distribution of request grants, such that each of a plurality of components from which the read/write requests 104 are received are granted an equal number of requests to access a destination during a subsequent arbitration window. Alternatively, in some implementations the masking values 122 indicate an uneven distribution of request grants, such that different ones of the plurality of components from which the read/write requests 104 are received are granted different numbers of requests to access the destination during the subsequent arbitration window.

A plurality of requests to access the destination are received from the at least one source during a subsequent arbitration window (block 516). The DNE masking module 108, for instance, receives read/write requests 104 from at least one requesting source to access a destination during a subsequent arbitration window. A subset of the plurality of requests are granted access to the destination as restricted by the masking value during the subsequent arbitration window (block 518). The DNE masking module 108, for instance, passes a subset of the read/write requests 104 as masked requests 110 to the arbitration network 112, where the subset is limited by the masking values 122. Operation then returns to block 506, where the procedure of FIG. 5 continues for successive arbitration windows.

Although features and elements are described above in particular combinations, each feature or element is usable alone without the other features and elements or in various combinations with or without other features and elements. In this manner, many variations are possible based on the disclosure herein.

The various functional units illustrated in the figures and/or described herein (including, where appropriate, the arbitration system 102, the DNE masking module 108, the arbitration network 112, the backpressure monitoring module 114, and the arbitration masking module 120) are implemented in any of a variety of different manners such as hardware circuitry, software executing or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving a plurality of requests to access a destination from at least one source;
granting each of the plurality of requests access to the destination during a first arbitration window;
detecting backpressure at the destination based on a number of the plurality of requests exceeding a number of requests available for receipt by the destination during the first arbitration window;
assigning a masking value by incrementing an index value for a lookup table that specifies request limit values for the at least one source, the masking value decreasing the number of the plurality of requests; and
granting a reduced number of requests access to the destination during a second arbitration window based on the masking value.

2. The method of claim 1, wherein the first arbitration window comprises a plurality of clock cycles of a processor device and granting each of the plurality of requests access to the destination comprises distributing access to the plurality of requests across the plurality of clock cycles, wherein detecting backpressure at the destination is performed based on the number of requests available for receipt by the destination during each of the plurality of clock cycles.

3. The method of claim 1, wherein the reduced number of requests comprises half of the number of the plurality of requests.

4. The method of claim 3, further comprising detecting backpressure at the destination during the second arbitration window and updating the masking value to grant a quarter of the number of the plurality of requests access to the destination during a third arbitration window.

5. The method of claim 3, further comprising updating the masking value to grant the number of the plurality of requests access to the destination during a third arbitration window in response to detecting that the reduced number of requests is less than the number of requests available for receipt by the destination during the second arbitration window.

6. The method of claim 1, wherein the masking value specifies a number of requests to be granted for each of a plurality of computing device components.

7. The method of claim 1, wherein assigning the masking value comprises performing a right bit shift operation.

8. The method of claim 1, wherein granting each of the plurality of requests access to the destination comprises communicating each of the plurality of requests to a buffer that communicates requests to the destination in response to receiving an indication of availability from the destination and wherein granting the reduced number of requests access to the destination comprises communicating the reduced number of requests to the buffer.

9. The method of claim 1, wherein assigning the masking value comprises designating a first number of requests to be granted access for a first source of the at least one source during the second arbitration window and designating a second number of requests that is different than the first number of requests to be granted access for a second source of the at least one source during the second arbitration window.

10. The method of claim 1, wherein the at least one source comprises a plurality of sources and assigning the masking value comprises assigning a distribution of the number of the plurality of requests among the plurality of sources.

11. A method comprising:
receiving a plurality of requests to access a destination from at least one source;
granting a subset of the plurality of requests access to the destination during a first arbitration window;
detecting an absence of backpressure at the destination based on a number of the plurality of requests available for receipt by the destination during the first arbitration window exceeding a number of requests included in the subset of the plurality of requests;
assigning a masking value by decrementing an index value for a lookup table that specifies request limit values for the at least one source, the masking value decreasing the number of the plurality of requests; and
granting an increased number of requests access to the destination during a second arbitration window based on the masking value.

12. The method of claim 11, wherein the first arbitration window comprises a plurality of clock cycles of a processor device and granting the subset of the plurality of requests access to the destination comprises distributing access to the subset of the plurality of requests across the plurality of clock cycles.

13. The method of claim 11, wherein the increased number of requests comprises double the number of requests included in the subset of the plurality of requests.

14. The method of claim 11, further comprising detecting backpressure at the destination during the second arbitration window and updating the masking value to grant the number of requests included in the subset of the plurality of requests access to the destination during a third arbitration window.

15. The method of claim 11, further detecting an absence of backpressure at the destination during the second arbitration window and updating the masking value to grant quadruple the number of requests included in the subset of the plurality of requests during a third arbitration window.

16. The method of claim 11, wherein assigning the masking value comprises performing a left bit shift operation.

17. The method of claim 11, wherein granting the subset of the plurality of requests access to the destination comprises communicating each of the subset of the plurality of requests to a buffer that communicates requests to the destination in response to receiving an indication of availability from the destination.

18. A system comprising:
a storage device including a lookup table that specifies request limit values; and
hardware circuitry configured to:
receive a plurality of requests to access a destination during a first arbitration window and grant access to each of the plurality of requests during the first arbitration window;
detect backpressure at the destination during the first arbitration window based on a number of the plurality of requests exceeding a number of requests available for receipt by the destination during the first arbitration window;
assign a masking value that reduces the number of the plurality of requests, in response to detecting backpressure at the destination during the first arbitration window, the masking value being assigned by updating an index value for the lookup table; and
grant a limited number of requests access to the destination during a second arbitration window based on the masking value.

19. The system of claim 18, wherein the hardware circuitry is configured to assign the masking value by incrementing the index value for the lookup table.

20. The system of claim 18, wherein the hardware circuitry is configured to assign the masking value by decrementing the index value for the lookup table.

* * * * *